United States Patent [19]

Hollaway, Jr.

[11] 4,258,582
[45] Mar. 31, 1981

[54] EMERGENCY DRIVE BELT AND METHOD FOR MAKING THE SAME

[75] Inventor: Gerald C. Hollaway, Jr., Springfield, Mo.

[73] Assignee: Dayco Corporation, Dayton, Ohio

[21] Appl. No.: 18,683

[22] Filed: Mar. 8, 1979

[51] Int. Cl.³ ............................................. F16G 1/26
[52] U.S. Cl. ................................ 474/254; 156/139; 474/259; 474/265
[58] Field of Search ............... 74/233, 232, 231 J; 156/137, 139, 140, 189, 191, 229, 289

[56] References Cited

U.S. PATENT DOCUMENTS

| | | | |
|---|---|---|---|
| 1,634,145 | 6/1927 | Hathaway | 156/139 |
| 1,912,807 | 6/1933 | Venosta | 74/232 |
| 2,985,222 | 5/1961 | Marty et al. | 74/233 |
| 2,995,045 | 8/1961 | Marty | 74/258 |
| 3,436,978 | 4/1969 | Rahmes | 74/232 |
| 3,461,733 | 8/1969 | Peterson | 74/238 |
| 3,501,971 | 3/1970 | Peterson | 74/231 J |
| 3,574,898 | 4/1971 | Scott et al. | 24/32 |
| 3,605,201 | 9/1971 | Peterson | 74/236 X |
| 3,725,976 | 4/1973 | Maekeown | 24/31 C |
| 3,777,586 | 12/1973 | Stirton | 74/231 J |
| 3,788,156 | 1/1974 | Jackson | 74/231 J |
| 3,841,168 | 10/1974 | Daniels | 74/231 J |
| 3,995,506 | 12/1976 | Poe | 74/232 |
| 4,031,766 | 6/1977 | Beck | 74/231 J |
| 4,038,879 | 8/1977 | Courtney | 74/231 J |

FOREIGN PATENT DOCUMENTS

| | | | |
|---|---|---|---|
| 456647 | 4/1950 | Italy | 156/137 |
| 71100 | 7/1915 | Switzerland | 74/232 |
| 6718 | 3/1913 | United Kingdom | 156/140 |

Primary Examiner—C. J. Husar
Assistant Examiner—Conrad Berman
Attorney, Agent, or Firm—Charles E. Bricker; Reuben Wolk

[57] ABSTRACT

An emergency drive belt and a method of forming the same are provided, wherein such method comprises the steps of winding a ribbon of a cured elastomeric material having a bonding medium on at least one side thereof around at least two spaced apart pulleys and continuing such winding until the belt is built up to a desired thickness.

8 Claims, 3 Drawing Figures

EMERGENCY DRIVE BELT AND METHOD FOR MAKING THE SAME

BACKGROUND OF THE INVENTION

This invention relates to endless power transmission belts, and more particularly to a temporary replacement drive belt for automotive vehicles which can be readily installed by the vehicle operator.

Automotive drive belts may sometimes fail or break at an inopportune time. It is not unusual to find three drive belts on a particular automobile. Some automobile owners or drivers equip their vehicles with one or more spare belts; however, these persons are in the minority. Even if spare belts were carried in the vehicle, replacement of a broken belt may require special tools or skills. It is desirable that some means by provided whereby a broken belt can be easily replaced so that the vehicle can be driven to a repair station.

In the prior art, numerous emergency belt solutions have been proposed, and these may be grouped as follows: In the first group are standard V-belts having special end connectors. U.S. Pat. No. 3,574,898 discloses means for joining the ends of a V-belt which include a pair of hinge like leaves, each leaf being secured to an end of the belt, a turnbuckle like clamp engaged with the hinge leaves to pull the opposing ends of the belt toward each other when entrained around pulleys, and a hingepin. The turnbuckle like element is removed after the hingepin is inserted through the interdigitated portion of the hinge leaves. U.S. Pat. No. 3,725,976 discloses a coupling comprising a pair of band connections having extensions with shaped slots or openings, which connections are secured around the side walls at opposite ends of the belt; and a metal sleeve with correspondingly shaped embossments or depressions which slidingly engages each end to interlock with the slots and form a continuous belt.

In the second group of emergency belts are those having particular configurations. This group may be further divided into belts having hollow-cores and special connectors, and belts having specialized connecting means.

Belts having hollow cores, either full length or extending some distance into the belt ends are disclosed in the following U.S. Pats Nos.; 2,995,045, 3,461,733, 3,501,971, 3,605,201 and 4,031,766.

Belts having specialized connecting means are disclosed as follows: U.S. Pat. No. 3,777,586 discloses a belt having a toothed and pronged male member at one end and a hollow toothed female member embedded in the opposite end. More than one length of belt can be inserted into each other to form any desired length.

U.S. Pat. No. 3,788,156 discloses a stretchable belt having a tubular wire mesh at one end secured therearound and extending therefrom, and a male member secured to the other end which has a series of radially projecting barbs, so that when the male member is fitted in the wire mesh on the other end, the barbs hold the ends together. In installing the device, the belt is entrained around the pulleys and then stretched to make the end connection.

U.S. Pat. No. 3,841,168 discloses a drive belt having grooves in each of the drive surfaces. Holes are provided in each end of the belt, extending between the bottom surfaces of the grooves. A coupling means secures the ends of the belt together.

U.S. Pat. No. 4,038,879 discloses a belt having a pocket of bonding medium at one end thereof and a pin at its other end. An attaching mechanism is necessary for pulling the two ends together and holding them until securely bonded.

The above-described belts may be regrouped into one group which allows assembly of the belt while entrained around the pulleys, and a second group which requires that the belt be assembled off the vehicle and then entrained around the pulleys. the first group are generally extensible, to allow for assembly, and may be so extensible as to be unsatisfactory for use on an automotive vehicle. The second group may be difficult to entrain around the pulleys without special tools.

It is therefore an object of the present invention to provide an improved emergency drive belt and a fabrication method therefor.

Other objects, aspects and advantages of the present invention will become evident from the description and the accompanying drawing.

SUMMARY OF THE INVENTION

In accordance with the present invention, there is provided a method for forming an emergency drive belt which comprises the steps of winding a ribbon of cured elastomeric material having a bonding medium on at least one surface thereof around at least two spaced-apart pulleys, and continuing to wind said ribbon to a desired depth. The resulting drive belt comprises at least one ribbon of the cured elastomeric material extending repeatedly along the length of the belt to form a plurality of layers with adjacent layers being bonded together with the bonding medium.

DETAILED DESCRIPTION OF THE DRAWING

Figure 1:
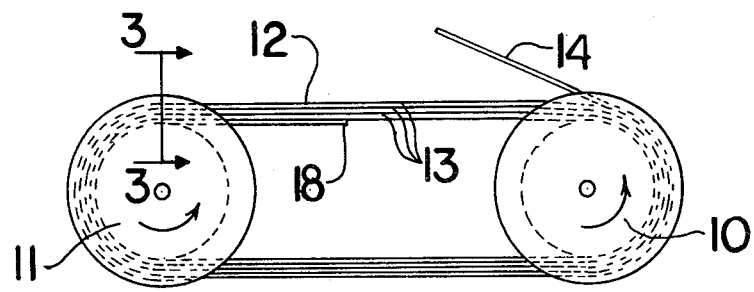
FIG. 1 illustrates the method of forming an emergency belt in accordance with the present invention.
Figure 3:
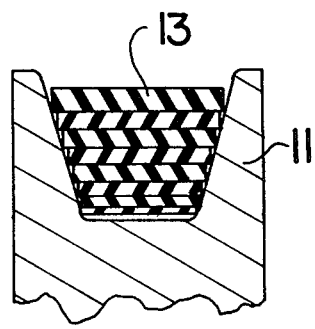
FIG. 3 is a sectional view taken along lines 3—3 of FIG. 1.
Figure 2:
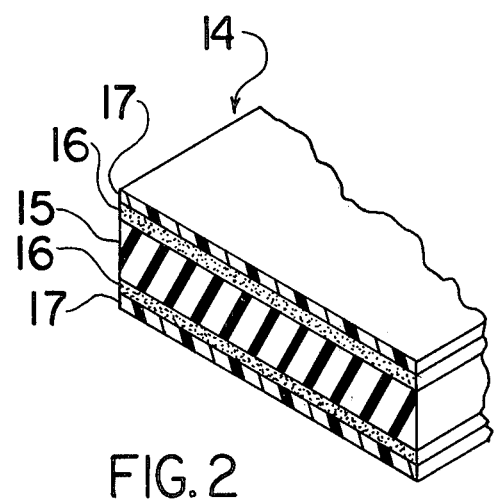
FIG. 2 is a perspective view of a portion of the ribbon-like material used in forming the emergency belt of this invention.

Referring now to the drawing, FIG. 1 illustrates a drive system comprising a driving pulley 10 and a driven pulley 11 and an emergency belt 12 entrained around the pulleys 10 and 11. The belt 12 comprises a plurality of layers 13 of a cured elastomeric material. The layers 13 are formed by winding a ribbon 14 of cured elastomeric material, as shown in FIG. 2, around the pulleys 10 and 11. Referring to FIG. 2, the ribbon 14 comprises a layer of cured elastomeric material 15 having a layer of bonding medium 16 on at least one surface thereof and, preferably, on both surfaces, as shown, and a protective layer 17 of suitable material on the outer surface of the bonding medium layer 16.

The emergency belt 12 is formed by removing at least a portion of the protective layer 17 from the ribbon 14. The ribbon 14 is then wound around the pulleys 10 and 11, preferably in the direction of rotation of the pulleys. The end 18 is held in position and the first loop of ribbon 14 is stretched, thereby decreasing both the thickness and the width of the ribbon 14, until the stretched portion has a width approximately equal to the width at the bottom of the pulley groove. The end 18 is then brought into contact with and bonded to the first loop.

By continuing to wind the ribbon 14 around the pulleys 10 and 11, the belt 12 is built up to a desired depth. Each layer subsequent to the first layer is stretched less to allow the ribbon 14 to become wider for better contact with the inclined pulley faces. The protective layer 17 is removed, as necessary, as the ribbon 14 is wound around the pulleys 10 and 11.

After the belt 12 is formed to the desired depth, the inside and the outside of the belt may be detackified by coating them with talc, graphite or the like.

The ribbon 14 is made from an elastomeric compound preferably rubber, which, when cured, has high tensile strength, i.e. in the approximate range of 3,800 to 4,500 psi., a high modulus of elasticity, i.e., in the approximate range of 1800 to 2,400 psi at 200% elongation, and a low compression set, i.e. about 15 to 25% as determined according to ASTM D-395, Method B. Suitable elastomers include natural and synthetic polymers and copolymers, and blends thereof. Natural rubber is presently preferred.

The elastomeric compound may contain carbon black, extender oil, fillers, vulcanizing agents, accelerators, antioxidants, antiozonants, and the like. Such components and their proportions are well known in the art and will not be further discussed for the purpose of brevity. These additives are incorporated into the uncured elastomeric stock using conventional compounding techniques and equipment.

The ribbon 14 may be made by a continuous process wherein the elastomeric compound is continuously extruded in ribbon form and the ribbon is thereafter cured or vulcanized in a continuous curing apparatus. The bonding medium 16 and the protective layer 17 are then applied to the cured ribbon.

Alternatively, the ribbon may be made by wrapping a sheet of the uncured elastomeric compound around a cylindrical building form, then curing the elastomer. Following the curing step, the bonding medium 16 is applied and it is then covered with the protective layer 17. The ribbon is obtained by cutting the assembly in a helical manner.

The bonding medium 16 may be any adhesive having sufficient tack to provide bonding of the layers upon contact. Such adhesives are generally based upon rubber, including natural rubber, nitrile, neoprene, SBR, polyisobutylene, and the like, and mixtures thereof. The adhesives also comprise tackifiers, resins, fillers, antioxidants, and the like. One suitable bonding medium is a neoprene based adhesive known as "Scotch Grip Rubber adhesive, EC 1300", available commercially from the 3M Company, Adhesives Coating and Sealers Division, Springfield, MO.

The protective layer 17 may be any material which will not permanently bond to the bonding medium 16, such as, for example, a vinyl material, polyester, coated paper, or the like.

It will be evident to those skilled in the art that various modifications of this invention can be made, in light of the foregoing disclosure, without departing from the scope and spirit thereof.

I claim:

1. A drive belt comprising at least one ribbon of cured elastomeric material extending repeatedly along the length of said belt to form a plurality of layers with adjacent layers being bonded together with a bonding medium, wherein said cured elastomeric material has a tensile strength in the approximate range of 3,800 to 4,500 psi., a modulus of elasticity in the approximate range of 1,800 to 2,400 psi. at 200% elongation and a compression set of about 15 to 25%.

2. The belt of claim 1 wherein said elastomeric material is rubber.

3. The belt of claim 2 wherein said rubber is natural rubber.

4. The method of forming an emergency drive belt which comprises the steps of providing a ribbon of cured elastomeric material having a bonding medium on at least one surface thereof and a protective layer of suitable material on the outer surface of said bonding medium, winding a first loop of said ribbon around at least two spaced apart pulleys, removing said protective layer, as necessary, to effect bonding of one the layers of elastomeric material to the next adjacent layer of elastomeric material, placing said first loop under tension, bonding the end of said ribbon to said first loop, thereby forming a first layer, and continuing said winding to a desired depth.

5. The method of claim 4 further comprising the step of applying a detackifying powder to the outer surface of the resulting belt.

6. The method of claim 4 wherein said ribbon is wound in the direction of rotation of said pulleys.

7. The method of claim 4 wherein said first loop is placed under sufficient tension to stretch said ribbon until the stretched portion thereof has a width approximately equal to the width of the bottom of the groove of said pulleys.

8. The method of claim 7 wherein each layer subsequent to said first layer is stretched less to allow said ribbon to be wider to allow contact with the inclined pulley faces.

* * * * *